United States Patent [19]

Sugimoto et al.

[11] Patent Number: 4,606,952
[45] Date of Patent: Aug. 19, 1986

[54] RUBBER LAMINATE

[75] Inventors: Masatoshi Sugimoto, Nagoya; Masayoshi Ichikawa, Ichinomiya; Kiyomitsu Terashima, Nagoya; Hiroji Enyo, Suzuka; Shinichiro Iwanaga, Yokkaichi; Eitaro Okuya, Komono, all of Japan

[73] Assignee: Toyoda Gosei Co., Ltd., Nishikasugai, Japan

[21] Appl. No.: 712,330

[22] Filed: Mar. 14, 1985

Related U.S. Application Data

[63] Continuation of Ser. No. 542,487, Oct. 17, 1983, abandoned.

[30] Foreign Application Priority Data

Oct. 15, 1982 [JP] Japan .................... 57-181575
Oct. 15, 1982 [JP] Japan .................... 57-181576
Oct. 15, 1982 [JP] Japan .................... 57-181577

[51] Int. Cl.$^4$ .................... F16L 11/04; B32B 27/08; B32B 27/38
[52] U.S. Cl. .................... 428/36; 428/64; 428/413; 428/421; 428/422; 428/492; 428/519; 428/520
[58] Field of Search .................... 428/421, 422, 492, 493, 428/495, 36, 64, 413, 519, 520

[56] References Cited

U.S. PATENT DOCUMENTS 4,321,306 3/1982 Eguchi .................... 428/492 X

OTHER PUBLICATIONS

Hackh's Chemical Dictionary, 4th Ed., 9-1977, McGraw-Hill Book Co., New York, p. 232.

Primary Examiner—Thomas J. Herbert
Attorney, Agent, or Firm—Cushman, Darby & Cushman

[57] ABSTRACT

A rubber laminate of a fluororubber layer and an NBR layer firmly bonded through vulcanization is provided. The fluororubber layer is made of a fluororubber compound containing a peroxide vulcanizing agent, polyol vulcanizing agent, or polyamine vulcanizing agent. In the case where the fluororubber compound contains a peroxide vulcanizing agent, it further contains a metal oxide. The NBR layer is made of a functional NBR having a specific functional group which is determined according to the vulcanizing agent contained in the fluororubber compound. In the case where the fluororubber compound contains a peroxide vulcanizing agent or polyol vulcanizing agent, the NBR compound further contains a metal oxide. The two layers are firmly bonded through vulcanization. This rubber laminate is used for automotive fuel hoses and fuel pump diaphragms.

14 Claims, 2 Drawing Figures

RUBBER LAMINATE

This is a continuation of application Ser. No. 542,487, filed Oct. 17, 1983, now abandoned.

BACKGROUND OF THE INVENTION

1. Field of the Invention:

The present invention relates to a rubber laminate of a fluororubber layer and an acrylonitrile-butadiene rubber (NBR) layer bonded through vulcanization. This rubber laminate is suitable as a raw material for automotive fuel hoses and fuel pump diaphragms.

2. Description of the Prior Art:

Fluororubbers is used for fuel hoses and fuel pump diaphragms and chemical resistant hoses and packings, owing to its superior resistance to heat, chemicals, oils, aging, and low temperature. However, their use is limited because it is 10 to 20 times as expensive as general-purpose rubber such as NBR. In order to overcome this economic disadvantage, it has been proposed to laminate a fluororubber layer to an NBR substrate in such a manner that the fluororubber layer is exposed to oil. And there are proposed several methods for improving the adhesion between the two layers, as in Japanese Patent Laid-open Nos. 53066/1981 and 121762/1981. According to these proposals, the adhesion is improved by incorporating the unvulcanized NBR with a metal oxide such as magnesium oxide and silica. These methods, however, are still unsatisfactory in improving the adhesion between a fluororubber layer and an NBR layer.

SUMMARY OF THE INVENTION

It is an object of this invention to provide a rubber laminate of a fluororubber layer and an NBR layer firmly bonded through vulcanization. The fluororubber layer is made of a fluororubber compound containing a peroxide vulcanizing agent, polyol vulcanizing agent, or polyamine vulcanizing agent. In the case where the fluororubber compound contains a peroxide vulcanizing agent, it further contains a metal oxide. The NBR layer is made of a functional NBR having a specific functional group which is determined according to the vulcanizing agent contained in the fluororubber compound. In the case where the fluororubber compound contains a peroxide vulcanizing agent or polyol vulcanizing agent, the NBR compound further contains a metal oxide. The fluororubber layer and the NBR layer are firmly bonded through vulcanization.

DETAILED DESCRIPTION OF THE INVENTION

Figure 1:
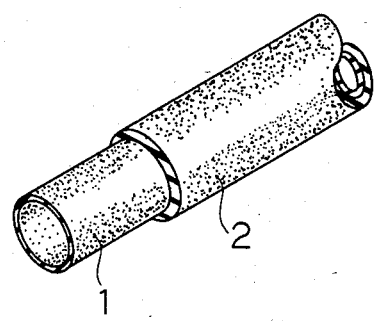
FIG. 1 is a perspective view of a rubber hose which is one embodiment of the laminate of this invention.

In the following description, the quantities are expressed in terms of weight, unless otherwise noted.

(A) The fluororubber layer is made of a fluororubber compound containing a peroxide vulcanizing agent, a polyol vulcanizing agent, or a polyamine vulcanizing agent. The fluororubber compound further contains a reinforcement, acid acceptor (usually MgO), vulcanization accelerator, and processing aid. In the case where a peroxide vulcanizing agent is employed, the fluororubber compound invariably contains an oxide or hydroxide of a metal selected from Groups II to IV of the periodic table (referred to a metal oxide hereinafter) in addition to the acid acceptor. In the case where a polyol vulcanizing agent or polyamine vulcanizing agent is employed, the fluororubber compound may contain a metal oxide.

The fluororubber includes vinylidene fluoride-propylene hexafluoride copolymer which is commercially available under the trade names of Viton A, Viton E45, Viton 60, Dai-el 701, Dai-el 702, Dai-el G501, Dai-el G601, etc.; vinylidene fluoride-propylene hexafluoride-ethylene tetrafluoride terpolymer which is commercially available under the trade names of Viton GF, Viton B, Viton GH, Viton VTR 5362, Dai-el G-901, Dai-el G-902, and tetrafluoro ethylene-propylene copoymer which is commercially available under the trade names of AFRAS 150P, AFRAS 150E, etc. "Viton" is a trade name of Dupont, "Dai-el" is a trade name of Daikin Kogyo Co., Ltd. and "AFRAS" is a trade name of Japan Synthetic Rubber Co., Ltd.

The peroxide vulcanizing agent includes, for example, dicumyl peroxide, 2,5-dimethyl-2,5-di(t-butylperoxy)hexane, 2,5-dimethyl-2,5-di(t-butylperoxy)hexyne-3, 1,1-bis(t-butylperoxyne)-3, 3,5-trimethylcyclohxane, and t-butylperoxy benzoate. It is incorporated in an amount of 1 to 10 PHR.

The polyol vulcanizing agent is an aromatic polyol compound used in combination with an ammonium salt or phosphonium salt. It is incorporated in an amount of 1 to 10 PHR. The aromatic polyol compound includes, for example, hexafluoroisopropylidene-bis-(4-hydroxyphenyl)hydroquinone and isopropylidene-bis-(4-hydroxyphenyl). The ammonium salt includes, for example, triphenylbenzylammonium chloride and tetraphenylammonium chloride. The phosphonium salt includes, for example, triphenylbenzyl phosphonium chloride, tetraphenylphosphonium chloride, and tetraoctylphosphonium chloride.

The polyamine vulcanizing agent includes, for example, hexamethylenediamine carbamate, alicyclic diamine carbamate, and dicinnamilidene hexamethylenediamine. It is incorporated in an amount of 1 to 10 PHR.

The metal oxide includes, for example, magnesium oxide, aluminum oxide, zinc oxide, zinc dioxide, calcium oxide, lead (II, IV) , and silicon dioxide, and hydroxides thereof. It is incorporated in an amount of 5 to 30 PHR.

(B) The NBR layer is made of a functional NBR to be vulcanized with a peroxide vulcanizing agent. The functional group of the functional NBR is selected according to the vulcanizing agent used in the fluororubber layer. The NBR compound contains a reinforcement, vulcanization accelerator, and processing aid. In the case where the fluororubber layer contains a peroxide vulcanizing agent or a polyol vulcanizing agent, the NBR compound invariably contains the above-mentioned metal oxide in addition to the adjuvants. In the case where the fluororubber layer contains a polyamine vulcanizing agent, the NBR compound may contain the above-mentioned metal oxide in addition to the adjuvants.

The functional NBR should have at least one member of epoxy group, carboxyl group, and amino group in the case where the fluororubber layer contains a peroxide vulcanizing agent or a polyamine vulcanizing agent. The functional NBR should have at least one member of epoxy group, amino group, and hydroxyl group in the case where the fluororubber layer contains a polyol vulcanizing agent.

The functional NBR is produced by copolymerizing a functional monomer having an epoxy group, carboxyl group, amino group, or hydroxyl group with butadiene (or isoprene) and acrylonitrile.

The functional monomer having an epoxy group includes, for example, glycidyl acrylate, glycidyl methacrylate, glycidyl vinyl ether, and glycidyl allyl ether.

The functional monomer having a carboxyl group includes, for example, acrylic acid, methacrylic acid, itaconic acid, fumaric acid, and maleic acid.

The functional monomer having an amino group includes, for example, dimethylaminoethyl acrylate, dimethylaminoethyl methacrylate, diethylaminoethyl acrylate, diethylaminoethyl methacrylate, dipropylaminoethyl acrylate, dipropylaminoethyl methacrylate, dibutylaminoethyl methacrylate, dibutylaminoethyl acrylate, dibutylaminopropyl methacrylate, and ethylaminoethyl methacrylate.

The functional monomer having a hydroxyl group includes, for example, hydroxyethyl acrylate, hydroxy methacrylate, and hydroxypropyl acrylate.

The quantity of the functional monomer in the functional NBR should be 0.5 to 20%, and preferably 1 to 15%. If it is less than 0.5%, the adhesion between layers is not sufficient; and if it is in excess of 20%, the adhesion between layers levels off and the properties of the rubber are adversely affected. The content in the functional NBR should preferably be 15 to 55% from the standpoint of oil resistance and low temperature resistance.

The polymerization is usually accomplished by emulsion polymerization, in whcih the polymerization initiator is a radical catalyst such as peroxide, persulfate, and azo compound; the emulsifier is a surface active agent such as fatty acid salt soap and sulfonate salt soap; and the molecular weight modifier is a sulfur compound such as n-dodecanethiol, t-dodecanethiol, and diisopropylxanthogensulfide, and a halogen compound such as carbon tetrachloride and carbon tetrabromide. The polymerization is accomplished in an oxygen-free atmosphere at 0° to 80° C. The resulting latex is coagulated with an acid or neutral aqueous solution of metal salt or with an alcohol, followed by washing with neutral or alkaline water.

The NBR is incorporated with a peroxide vulcanizing agent, metal oxide, and common adjuvants as mentioned for the fluororubber compound.

The fluororubber layer 1 of the compound (A) and the NBR layer 2 (substrate) of the compound (B) may be bonded in any way.

Figure 2:
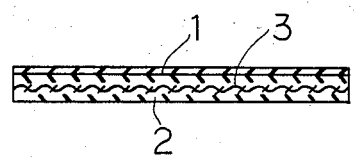
FIG. 2 is a perspective view of a diaphragm which is another embodiment of the laminate of this invention.

A rubber hose as shown in FIG. 1 may be produced by extruding the two compounds in layers simultaneously or separately with one extruder or two extruders, and then vulcanizing the extrudate at 145° to 170° C. for 30 to 90 minutes. A diaphragm as shown in FIG. 2 may be produced by rolling each compound into a sheet, punching the sheet, and press-forming the punched sheets placed one over another, followed by vulcanization at 150° to 190° C. for 3 to 30 minutes under 50 to 150 kgf/cm². Incidentally, there is shown a base fabric layer at 3 in FIG. 2.

The invention is described in more detail with reference to the following examples and comparative examples.

The functional NBR (designated as polymers "a" to "f") used in examples and comparative examples were prepared as follows:

The components shown in Table 1 were subjected to emulsion polymerization at 30° C. in an autoclave. When the rate of polymerization reached about 70%, the polymerization was stopped by adding 0.2 part of hydroxydiethylamine for 100 parts of the monomer. The resulting rubber latex was incorporated with an alkylated phenol (antioxidant) and then coagulated with 2 PHR of calcium chloride aqueous solution, followed by washing with water. Incidentally, a commercial NBR ("JSR N220S", a product of Japan Synthetic Rubber Co., Ltd.) having no functional group was designated as "g".

The test pieces in Examples and Comparative Examples were prepared as follows: Each of NBR rubber compounds (N1 to N19) shown in Table 2 was rolled into a 4-mm thick sheet, and each of fluororubber compounds (F1 to F17) shown in Table 3 was rolled into a 4-mm thick sheet. The two sheets combined as shown in Table 4 were placed one over another and vulcanized at 170° C. for 15 minutes under 150 kgf/cm². The peel test was carried out according to JIS K6301. The results are shown in Table 4.

In the peel test, all the specimens obtained in Examples exhibited such a high interlaminar strength that the rubber layer was broken. All the specimens obtained in Comparative Examples peeled at the interface.

In Examples 1 to 5 and Comparative Examples 1 to 4, the fluororubber was vulcanized with a peroxide vulcanizing agent. The interlaminar strength was low in Comparative Examples 1 and 2, in which the NBR layer or fluororubber layer contained no metal oxide, in Comparative Example 3, in which the NBR layer was made of an ordinary NBR containing no functional group, and in Comparative Example 4, in which the NBR layer was not vulcanized with a peroxide vulcanizing agent.

In Examples 6 to 10 and Comparative Examples 5 to 8, the fluororubber was vulcanized with a polyol vulcanizing agent. The interlaminar strength was low in Comparative Example 6, in which the NBR layer contained no metal oxide, in Comparative Example 7, in which the NBR layer was made of an ordinary NBR containing no functional group, in Comparative Example 8, in which the NBR layer was not vulcanized with a peroxide vulcanizing agent, and in Comparative Example 9, in which the fluororubber layer was not vulcanized with a polyol vulcanizing agent.

In Examples 11 to 18 and Comparative Examples 9 to 12, the fluororubber was vulcanized with a polyamine vulcanizing agent. The interlaminar strength was low in Comparative Examples 9 and 11, in which the NBR layer was made of an ordinary NBR containing no functional group, in Comparative Example 10, in which the fluororubber layer was not vulcanized with a polyamine vulcanizing agent, and in Comparative Example 11, in which the NBR layer was not vulcanized with a peroxide vulcanizing agent.

TABLE 1

| Polymer | a | b | c | d | e | f |
|---|---|---|---|---|---|---|
| BD (parts) | 43 | 57 | 46 | 43 | 54 | 43 |
| AN (parts) | 47 | 36 | 47 | 47 | 36 | 47 |

TABLE 1-continued

| Polymer | a | b | c | d | e | f |
|---|---|---|---|---|---|---|
| Functional monomer (parts) | MGA 10 | AGE 7 | MA 7 | DEAMA 10 | DMAMA 10 | HPMA 10 |
| Chemicals used for polymerization (parts) | Water 220 Fatty acid soap (K) 6 t-dodecanethiol 0.58 Potassium persulfate 0.27 Cyanoethyl diethanolamine 0.15 Potassium hydroxide 0.10 | | | Water 220 Formalin condensate of sodium β-napthalene sulfate 4 Sodium dodecylbenzene sulfonate 2 t-dodecanethiol 0.58 Potassium persulfate 0.27 Cyanoethyl diethanolamine 0.15 Potassium hydroxide 0.10 | | |
| Quantity of functional monomer | 7% | 5% | 3% | 7% | 7% | 7% |
| Viscosity ML$_4$ | 55.0 | 57.0 | 49.0 | 56.0 | 60.0 | 49.0 |

Remarks:
BD: butadiene, AN: acrylonitrile, GMA: glycidyl methacrylate (epoxy group), AGE: allyl glycidyl ether (epoxy group), MA: methacrylic acid (carboxyl group), DEAMA: diethylaminoethyl methacrylate (amino group), DMAMA: dimethylaminoethyl acrylate (amino group), HPMA: hydroxypropyl methacrylate (hydroxyl group).

TABLE 2

Unit: PHR

| | N-1 | N-2 | N-3 | N-4 | N-5 | N-6 | N-7 | N-8 | N-9 | N-10 | N-11 | N-12 | N-13 | N-14 | N-15 | N-16 | N-17 | N-18 | N-19 |
|---|---|---|---|---|---|---|---|---|---|---|---|---|---|---|---|---|---|---|---|
| Functional NBR | a | b | c | d | e | f | g | a | a | d | a | b | c | d | e | g | a | a | a |
| Adjuvants | | | | | | | | | | | | | | | | | | | |
| MFA black | 40 | 40 | 40 | 40 | 40 | 40 | 40 | 40 | 40 | 40 | 40 | 40 | 40 | 40 | 40 | 40 | 40 | 40 | 40 |
| Stearic acid | 1 | 1 | 1 | 1 | 1 | 1 | 1 | 1 | 1 | 1 | 1 | 1 | 1 | 1 | 1 | 1 | 1 | 1 | 1 |
| Zinc oxide | 5 | 5 | 5 | | 5 | 5 | 5 | 5 | | | 5 | 5 | 5 | 5 | | 5 | 5 | 5 | 5 |
| Vulcanizing agent | | | | | | | | | | | | | | | | | | | |
| Organic peroxide A *1 | | | | | | | | | | | | | | | | | 6 | | |
| Organic peroxide B *2 | | 6 | | | | | | | | | | | | | | | | 6 | |
| Organic peroxide C *3 | 6 | | 6 | 6 | 6 | 6 | 6 | | 6 | 6 | 6 | 6 | 6 | 6 | 6 | 6 | | | |
| Organic peroxide D *4 | | | | | | | | | | | | | | | | | | | 6 |
| Triallyl isocyanurate | 3 | 3 | 3 | 3 | 3 | 3 | 3 | | 3 | 3 | 3 | 3 | 3 | 3 | 3 | 3 | | | |
| Sulfur | | | | | | | | 0.5 | | | | | | | | | | | |
| CZ *5 | | | | | | | | 2 | | | | | | | | | | | |
| TT *6 | | | | | | | | 2 | | | | | | | | | | | |
| Metal oxide | | | | | | | | | | | | | | | | | | | |
| MgO | 20 | 20 | | | | | | 20 | 20 | | | | | | | 20 | | | |
| Al(OH)$_3$ | | | 20 | | | 20 | | | | | | | | | | | | | |
| Ca(OH)$_2$ | | | | 20 | | | | | | | | | | | | | | | |
| PbO | | | | | 20 | | | | | | | | | | | | | | |

Note to Table 2
*1 Dicumyl peroxide, 40%
*2 1,1-bis(t-butylperoxy)3,3,5-trimethylcyclohexane, 40%
*3 2,5-dimethyl-2,5-di(t-butylperoxy)hexane, 40%
*4 2,5-dimethyl-2,5-di(t-butylperoxy)hexane-3, 40%
*5 N—cyclohexyl-2-benzylthiazole-sulfenamide
*6 Tetramethyl-theuram-disulfide

TABLE 3

Unit: Parts by weight

| | F-1 | F-2 | F-3 | F-4 | F-5 | F-6 | F-7 | F-8 | F-9 | F-10 | F-11 | F-12 | F-13 | F-14 | F-15 | F-16 | F-17 |
|---|---|---|---|---|---|---|---|---|---|---|---|---|---|---|---|---|---|
| Fluororubber | | | | | | | | | | | | | | | | | |
| Viton GF | 100 | | | | | | | | | | | | | | | | |
| Dai-el G901 | | 100 | | | | | 100 | | | | | | | 100 | | | |
| Dai-el G902 | | | 100 | 100 | | | | 100 | 100 | 100 | | | | | 100 | 100 | 100 |
| Viton E45 | | | | | 100 | | | | | | | | | | | | |
| Viton E60 | | | | | | 100 | | | | | | | | | | | |
| Viton GH | | | | | | | | | | | 100 | | | | | | |
| Viton A | | | | | | | | | | | | 100 | | | | | |
| Viton B | | | | | | | | | | | | | 100 | | | | |
| Adjuvants | | | | | | | | | | | | | | | | | |
| MT black | 20 | 20 | 20 | 20 | 20 | 20 | 20 | 20 | 20 | 20 | 20 | 20 | 20 | 20 | 20 | 20 | 20 |
| MgO | 15 | | 15 | | | | 15 | | | | 15 | 15 | 15 | 3 | 15 | 15 | 15 |
| Ca(OH)$_2$ | | 15 | | | 6 | 6 | 6 | 6 | 6 | | | | | | | | |
| Vulcanizing agents | | | | | | | | | | | | | | | | | |
| Organic peroxide *1 | | 3 | | | | | | | | | | | | | | | |
| Organic peroxide *2 | 3 | | 3 | 3 | | | | | | 3 | | | | | | | 3 |
| Triallyl isocyanurate | 3 | 3 | 3 | 3 | | | | | | 3 | | | | | | | 3 |
| Curative #20 *3 | | | | | 6 | 6 | 6 | | | | | | | | | | |
| Curative #30 *4 | | | | | 9 | 9 | 9 | | | | | | | | | | |
| P-2 *5 | | | | | | | | | | | | | | 6 | | | |
| P-3 *6 | | | | | | | | | | | | | | 9 | | | |

TABLE 3-continued

Unit: Parts by weight

| | F-1 | F-2 | F-3 | F-4 | F-5 | F-6 | F-7 | F-8 | F-9 | F-10 | F-11 | F-12 | F-13 | F-14 | F-15 | F-16 | F-17 |
|---|---|---|---|---|---|---|---|---|---|---|---|---|---|---|---|---|---|
| Hexamethylene-diamine carbamate | | | | | | | | | | | 4 | 4 | 4 | 4 | 4 | | |
| Alicyclic diamine carbamate | | | | | | | | | | | | | | | | | 4 |

Note to Table 3
*1 1,1-bis(t-butylperoxy)3,3,5-trimethylcyclohexane, 40%
*2 2,5-dimethyl-2,5-di(t-butylperoxy)hexane, 40%
*3 A product of DuPont, phosphonium salt
*4 A product of DuPont, aromatic polyol compound
*5 A product of Daikin Kogyo Co., Ltd., ammonium salt
*6 A product of Daikin Kogyo Co., Ltd., aromatic polyol compound

TABLE 4

| | Fluoro-rubber layer | NBR layer | Bond strength** |
|---|---|---|---|
| Example 1 | F-3 *1 | N-1 | 8.0 |
| Example 2 | F-1 *1 | N-2 | 8.0 |
| Example 3 | F-2 *1 | N-3 | 8.0 |
| Example 4 | F-3 *1 | N-4 | 8.0 |
| Example 5 | F-3 *1 | N-5 | 8.0 |
| Comp. Ex. 1 | F-4 *1 | N-1 | 0 |
| Comp. Ex. 2 | F-3 *1 | N-9 | 1.0 |
| Comp. Ex. 3 | F-3 *1 | N-7 | 0.5 |
| Comp. Ex. 4 | F-3 *1 | N-8 | 0 |
| Example 6 | F-5 *2 | N-1 | 10.0 |
| Example 7 | F-6 *2 | N-2 | 10.0 |
| Example 8 | F-7 *2 | N-6 | 10.0 |
| Example 9 | F-8 *2 | N-4 | 10.0 |
| Example 10 | F-9 *2 | N-5 | 10.0 |
| Comp. Ex. 5 | F-8 *2 | N-10 | 1.5 |
| Comp. Ex. 6 | F-8 *2 | N-7 | 1.0 |
| Comp. Ex. 7 | F-8 *2 | N-8 | 0.2 |
| Comp. Ex. 8 | F-10 *2 | N-1 | 0 |
| Example 11 | F-15 *3 | N-11 | 6.0 |
| Example 12 | F-11 *3 | N-12 | 4.0 |
| Example 13 | F-14 *3 | N-13 | 7.0 |
| Example 14 | F-15 *3 | N-14 | 6.0 |
| Example 15 | F-16 *3 | N-15 | 4.0 |
| Example 16 | F-15 *3 | N-17 | 6.0 |
| Example 17 | F-12 *3 | N-18 | 8.0 |
| Example 18 | F-13 *3 | N-19 | 6.0 |
| Comp. Ex. 9 | F-15 *3 | N-16 | 1.4 |
| Comp. Ex. 10 | F-17 *3 | N-11 | 0.5 |
| Comp. Ex. 11 | F-15 *3 | N-7 | 1.8 |
| Comp. Ex. 12 | F-15 *3 | N-8 | 0.2 |

**Unit: kgf/in. In all the examples, breakage occurred in the rubber layer.
*1 Vulcanized with a peroxide
*2 Vulcanized with a polyol
*3 Vulcanized with a polyamine

What is claimed is:

1. An automotive fuel hose or fuel pump diaphragm made of a rubber laminate which comprises a fluororubber layer and a butadiene-acrylonitrile rubber (NBR) layer bonded together through vulcanization,
   said fluororubber layer bieng made of a fluororubber compound selected from the group consisting of vinylidene fluoride-propylene hexafluoride copolymer, vinylidene fluoride-propylene hexafluoride-ethylene tetrafluoride terpolymer, and tetrafluoro ethylene-propylene copolymer, said fluororubber having incorporated therein a peroxide vulcanizing agent and an oxide or hydroxide of a metal selected from Groups II to IV of the periodic table in addition to the oridinary adjuvants, and
   said butadiene-acrylo-nitrile rubber layer being made of an NBR rubber compound having at least one functional group selected from an epoxy group, a carboxyl group, and an amino group, the NBR rubber compound also containing a peroxide vulcanizing agent and a metal oxide in addition to the ordinary adjuvants.

2. A rubber laminate as recited in claim 1, wherein the NBR contains the functional monomer in an amount of 0.5 to 20 wt %.

3. A rubber laminate as recited in claim 1, wherein the metal oxide and metal hydroxide are any one of MgO, Ca(OH)$_2$, Al(OH)$_3$, and PbO.

4. A rubber hose made of the laminate of claim 1 in which the inner layer is the fluororubber and the outer layer is the NBR.

5. A rubber diaphram made of the laminate of claim 1.

6. An automotive fuel hose or fuel pump diaphragm made of a rubber laminate which comprises a flurorubber layer and an NBR layer binded together through vulcanization,
   said fluororubber layer being made of a fluororubber compound selected from the group consisting of vinylidene fluoride-propylene hexafluroide-ethylene tetrafluroide terpolymer, and tetrafluoro ethylene-propylene copolymer, said fluororubber having incorporated therein a polyol vulcanizing agent in addition to the ordinary adjuvants, and
   said NBR layer being made of an NBR rubber compound having at least one functional group selected from an epoxy group, a hydroxyl group, and an amino group, the NBR rubber compound also containing a peroxide vulcanizing agent and a metal oxide in addition to the ordinary adjuvants.

7. A rubber laminate as recited in claim 6, wherein the NBR contains the functional monomer in an amount of 0.5 to 20 wt %.

8. A rubber laminate as recited in claim 6, wherein the metal oxide and metal hydroxide are any one of MgO, Ca(OH)$_2$, Al(OH)$_3$, and PbO.

9. A rubber hose made of the laminate of claim 6 in which the inner layer is the fluororubber and the outer layer is the NBR.

10. A rubber diaphram made of the laminate of claim 6.

11. An automotive fuel hose or fuel pump diaphragm made of a rubber laminate which comprises a fluororubber layer and an NBR layer bonded together through vulcanization,
    said fluororubber layer being made of a fluororubber compound selected from the group consisting of vinylidene fluoride-propylene hexafluoride copolymer, vinylidene fluoride-propylene hexafluoride-ethylene tetrafluoride terpolymer, and tetrafluoro ethylene-propylene copolymer, said fluororubber having incorporated therein a polyamine vulcanizing agent in addition to the ordinary adjuvants, and said NBR layer being made of an NBR rubber compound having at least one functional group selected from an epoxy group, and an amino group, the NBR rubber compound also containing a peroxide vulcanizing agent in addition to the ordinary adjuvants.

12. A rubber laminate as recited in claim 11, wherein the NBR contains the functional monomer in an amount of 0.5 to 20 wt %.

13. A rubber hose made of the laminate of claim 11 in which the inner layer is the fluororubber and the other layer is the NBR.

14. A rubber diaphram made of the laminate of claim 11.

* * * * *

UNITED STATES PATENT AND TRADEMARK OFFICE
CERTIFICATE OF CORRECTION

PATENT NO. : 4,606,952
DATED : August 19, 1986
INVENTOR(S) : SUGIMOTO et al.

It is certified that error appears in the above-identified patent and that said Letters Patent is hereby corrected as shown below:

Page 1, [73] Assignee: Should be Toyoda Gosei Co., Ltd, Nishikasugai, Japan -- and Japan Synthetic Rubber Co., Ltd., Tokyo, Japan --.

Signed and Sealed this

Twenty-fifth Day of August, 1987

Attest:

DONALD J. QUIGG

*Attesting Officer*  *Commissioner of Patents and Trademarks*